US009883639B2

(12) United States Patent
Iwasaki

(10) Patent No.: US 9,883,639 B2
(45) Date of Patent: Feb. 6, 2018

(54) DRIP-IRRIGATION EMITTER AND DRIP-IRRIGATION DEVICE PROVIDED THEREWITH

(71) Applicant: Enplas Corporation, Saitama (JP)

(72) Inventor: Mike Iwasaki, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 14/653,358

(22) PCT Filed: Dec. 19, 2013

(86) PCT No.: PCT/JP2013/007480
§ 371 (c)(1),
(2) Date: Jun. 18, 2015

(87) PCT Pub. No.: WO2014/097638
PCT Pub. Date: Jun. 26, 2014

(65) Prior Publication Data
US 2016/0183482 A1    Jun. 30, 2016

(30) Foreign Application Priority Data
Dec. 20, 2012   (JP) ................................. 2012-278353

(51) Int. Cl.
*A01G 25/02* (2006.01)
*B05B 15/06* (2006.01)

(52) U.S. Cl.
CPC ........... *A01G 25/023* (2013.01); *A01G 25/02* (2013.01); *B05B 15/069* (2013.01)

(58) Field of Classification Search
CPC ..... A01G 25/02; A01G 25/023; B05B 15/069
(Continued)

(56) References Cited

U.S. PATENT DOCUMENTS 3,981,452 A * 9/1976 Eckstein .............. A01G 25/023
239/542
3,993,248 A * 11/1976 Harmony ................ B05B 1/323
138/103

(Continued)

FOREIGN PATENT DOCUMENTS

| JP | 2010-046094 A | 3/2010 |
| JP | 2012-118551 A | 6/2012 |
| JP | 2012-216575 A | 11/2012 |

*Primary Examiner* — Alexander Valvis
(74) *Attorney, Agent, or Firm* — Brundidge & Stanger, P.C.

(57) ABSTRACT

This drip-irrigation device has plate-shaped inflow parts, an emission-rate control part, and a first groove section. The long direction of each inflow part is parallel to the lengthwise direction of a circulation tube that has a bottom surface joined to the inside surface thereof and a top surface opposite said bottom surface. The inflow parts are laid out on said top surface and cause an irrigation liquid inside the circulation tube to flow into channels. The emission-rate control part controls the rate with which said irrigation liquid is emitted, via the channels, from emission holes. The first groove section is formed as a recess in the aforementioned top surface, from one lengthwise end thereof towards the other lengthwise end, and is shaped such that the width and depth thereof gradually decrease with decreasing distance from said other lengthwise end.

11 Claims, 13 Drawing Sheets

(58) Field of Classification Search
USPC ..... 239/542, 547; 138/37, 40, 42, 43, 45, 46
See application file for complete search history.

(56) References Cited

U.S. PATENT DOCUMENTS

| | | | | |
|---|---|---|---|---|
| 4,756,339 | A | * | 7/1988 | Buluschek ............. A01G 25/02 138/103 |
| 4,869,432 | A | * | 9/1989 | Christy ................. B05B 1/3006 138/45 |
| 5,400,973 | A | * | 3/1995 | Cohen .................. A01G 25/023 239/533.1 |
| 5,615,838 | A | | 4/1997 | Eckstein et al. |
| 6,027,048 | A | | 2/2000 | Mehoudar |
| 6,116,523 | A | * | 9/2000 | Cabahug ............. A01G 25/023 138/42 |
| 6,206,305 | B1 | | 3/2001 | Mehoudar |
| 6,302,338 | B1 | | 10/2001 | Cohen |
| 2010/0096478 | A1 | | 4/2010 | Mamo |

* cited by examiner

DRIP-IRRIGATION EMITTER AND DRIP-IRRIGATION DEVICE PROVIDED THEREWITH

TECHNICAL FIELD

The present invention relates to a drip irrigation dripper and a drip irrigation device including the drip irrigation dripper, and particularly to a drip irrigation dripper and a drip irrigation device including the drip irrigation dripper, which are suitable for growing plants.

BACKGROUND ART

Drip irrigation systems have been used to supply water and/or irrigation liquids such as liquid fertilizer to the plants grown on the soil in the agricultural land, plantation and the like.

Such a drip irrigation system includes a pump for pumping up water from the water source, a filter, a fertigation device (chemigation device if necessary), a back flow prevention device, a main pipe, an elongated drip watering tube connected to the terminal of the main pipe, and the like. The drip watering tube is laid on the soil on which plants are grown.

The drip watering tube is configured to eject a predetermined amount of irrigation liquid in the tube main body per unit time (i.e., at a predetermined ejection rate) from a plurality of ejection ports bored in the elongated tube main body at predetermined intervals along the length of the tube main body, to slowly supply the irrigation liquid (i.e., to perform drip irrigation) to the soil outside the drip watering tube.

The use of the drip watering tube enables one not only to save water and fertilizer but also to supply water at a moderate supply rate. In addition, the oxygen required for plant roots can be ensured in the soil. Thus, growing of plants can be favorably managed.

In such a drip watering tube, a plurality of drip irrigation drippers for controlling the ejection amount of the irrigation liquid from each of ejection ports per unit time are provided at the respective ejection ports.

In this drip irrigation dripper, water flowing in the tube main body flows into the drip irrigation dripper through the inflow port and flows through a pressure reduction channel (labyrinth) inside the drip irrigation dripper in such a manner that the pressure of the irrigation liquid is reduced, and then, the irrigation liquid is ejected from the ejection port communicated with the downstream side of the pressure reduction channel.

Some drip irrigation drippers are provided with a so-called differential pressure control mechanism (pressure correction function). Such drip irrigation drippers of this type have for example a three-component structure in which an elastic film (for example, silicone rubber) such as a diaphragm is sandwiched by an inflow side member and an ejection side member, as with the drip irrigation dripper (emitter unit) disclosed in PTL 1.

As disclosed also in paragraph [0004] of PTL 1, the drip irrigation dripper of this type is designed such that the ejection amount of the irrigation liquid from the drip irrigation dripper (emitter) has substantially no relation with the variation in pressure of the irrigation flow supplied to the drip irrigation dripper.

Therefore, the drip irrigation dripper of this type has been expected to suppress non-uniformity in the ejection amount of the irrigation liquid between the drip irrigation drippers disposed on the upstream side (high pressure side) and those disposed on the downstream side (low pressure side) in the tube main body, to thereby equalize the grow rate of plant on the entire soil. cl CITATION LIST Patent Literature PTL 1
Japanese Patent Application Laid-Open No. 2010-46094

SUMMARY OF INVENTION

Technical Problem

However, although the drip irrigation dripper disclosed in PTL 1 has a high performance, it requires a large number of components causing the drip irrigation dripper to be undesirably larger in size (in particular, larger in height). In addition, when the drip irrigation dripper is disposed in the tube main body, the area occupancy of the drip irrigation dripper inside the tube main body with respect to the cross-section of the channel becomes larger.

Therefore, in the tube main body, the drip irrigation dripper on the upstream side is laid on the channel, and thus undesirably serves as a large hindrance to hinder the flow of the irrigation liquid that passes the drip irrigation dripper on the upstream side to be ejected to the outside from the drip irrigation dripper on the downstream side, causing the pressure drop to be increased.

Accordingly, when the drip irrigation dripper disclosed in PTL 1 is used, it may be difficult to perform long-distance watering utilizing a considerably long drip watering tube unless a high pressure pump is used, so that the ejection amount may also be unstable.

It is noted that, while there have been measures to reduce the pressure drop heretofore, such as chamfering of the corners of the drip irrigation dripper, those measures have been still insufficient for performing stable long-distance watering.

It is an object of the present invention to provide a drip irrigation dripper capable of effectively alleviating the pressure drop to properly perform long-distance watering, and a drip irrigation device including the drip irrigation dripper.

Solution to Problem

A drip irrigation dripper of the present invention is a drip irrigation dripper to be disposed on an inner peripheral surface of an elongated flow pipe configured to allow an irrigation liquid to flow therethrough at a position corresponding to an ejection port for the irrigation liquid, the ejection port extending through the inner peripheral surface and an outer peripheral surface of the flow pipe, the drip irrigation dripper configured to perform drip irrigation by ejecting the irrigation liquid from the ejection port, the drip irrigation dripper being formed into a shape of plate elongated in a longitudinal direction of the flow pipe to have a bottom surface to be joined to the inner peripheral surface of the flow pipe and a top surface opposite to the bottom surface, the drip irrigation dripper comprising:

an inflow part disposed in the top surface to allow the irrigation liquid in the flow pipe to flow into a channel of the drip irrigation dripper main body;

an ejection amount control part disposed at a positon on a downstream side of the inflow part in the channel of the drip irrigation dripper main body to control an ejection amount of the irrigation liquid ejected from the ejection port through the channel; and a first groove part formed in the top surface, the first groove part extending from a first end toward a second end of the top surface in the longitudinal direction, wherein:

the first groove part is formed in such a shape that a groove width and a groove depth are gradually decreased toward the second end.

The first groove part may be formed into a wedge shape.

The first groove part may be formed in such a shape that the groove depth is gradually increased toward a center portion in a groove width direction.

The first groove part may be formed in such a shape that a center line in the groove width direction is inclined relative to the longitudinal direction.

A filter structure for inhibiting foreign matters from entering the channel may be formed in the first groove part.

The drip irrigation dripper may further include in the top surface a second groove part that extends from a second end toward a first end in the longitudinal direction, and the second groove part may be formed in such a shape that a groove width and a groove depth are gradually decreased toward the first end.

The second groove part may be formed into a wedge shape.

The second groove part may be formed in such a shape that the groove depth is gradually increased toward a center portion in a groove width direction.

The second groove part may be formed in such a shape that a center line in the groove width direction is inclined relative to the longitudinal direction.

The drip irrigation dripper may further include in the top surface a second groove part that extends from a second end toward a first end in the longitudinal direction, and the second groove part may be formed in such a shape that a groove width and a groove depth are gradually decreased toward the first end, and may be formed in such a shape that a center line in the groove width direction is parallel to the center line of the first groove part.

A filter structure for inhibiting foreign matters from entering the channel may be formed in the second groove part.

A drip irrigation device of the present invention includes: an elongated flow pipe configured to allow an irrigation liquid to flow therethrough; and the drip irrigation dripper according to the present invention disposed at a position corresponding to an ejection port for irrigation liquid which extends through the inner peripheral surface and the outer peripheral surface of the flow pipe.

In the drip irrigation device of the present invention, the first groove part may be disposed in the top surface on an upstream end side in a flow direction of the irrigation liquid in the flow pipe.

According to such configurations, the first groove part can reduce the channel resistance by the drip irrigation dripper to the irrigation liquid flowing in the flow pipe to increase the rectilinearity of the irrigation liquid, and thus pressure drop of the irrigation liquid can be reduced, making it possible to properly perform long-distance watering. Suitably configuring the shape of the first groove part can further enhance the rectilinearity of the irrigation liquid. The flow of the irrigation liquid flowing over the first groove part can be gathered toward the center portion in the width direction to enable the flow to be straightened along the central portion, and thus the rectilinearity of the irrigation liquid can be further enhanced. The first groove part can generate a spiral vortex flow of the irrigation liquid in the flow pipe, thus forming a flow of the irrigation liquid that is not easily resisted by the drip irrigation dripper as much as possible, to thereby enable pressure drop to be reduced further effectively. It is also possible to provide an effect of flushing a filter structure with the irrigation liquid flowing over the first groove part at high speed. Even when the drip irrigation dripper is wrongly assembled reversely in the longitudinal direction in the flow pipe, the second groove part can achieve similar functions as those of the first groove part, thus enhancing the manufacturing easiness and the yield rate. Even when wrong assembly occurs, suitably configuring the shape of the second groove part can further enhance the rectilinearity of the irrigation liquid. Even when wrong assembly occurs, the flow of the irrigation liquid flowing over the second groove part can be gathered toward the center portion in the width direction to enable the flow to be straightened along the central portion, and thus the rectilinearity of the irrigation liquid can be further enhanced. Even when wrong assembly occurs, the second groove part can generate a spiral vortex flow of the irrigation liquid in the flow pipe, thus forming a flow of the irrigation liquid that is not easily resisted by the drip irrigation dripper as much as possible, to thereby enable pressure drop to be reduced further effectively. The cooperative operation of the first and second groove parts in a plurality of drip irrigation drippers disposed along the channel inside the flow pipe can sustain the spiral vortex flow over a long distance, and thus the pressure drop can be effectively reduced over a long distance. It is possible to achieve an effect of flushing a filter structure with the irrigation liquid flowing over the second groove part at high speed. The reduction in the channel resistance by the drip irrigation dripper to the irrigation liquid flowing in the flow pipe can enhance the rectilinearity of the irrigation liquid, and thus pressure drop of the irrigation liquid can be reduced, making it possible to properly perform long-distance watering. Allowing the first groove part to properly function can ensure that the desired operation and effect are achieved.

Advantageous Effects of Invention

According to the present invention, pressure drop can be effectively reduced, making it possible to properly perform long-distance watering.

DESCRIPTION OF EMBODIMENTS

Embodiment 1

In the following, a drip irrigation dripper according to Embodiment 1 of the present invention will be described with reference to FIGS. 1 to 3.

(Configuration)

Figure 1:
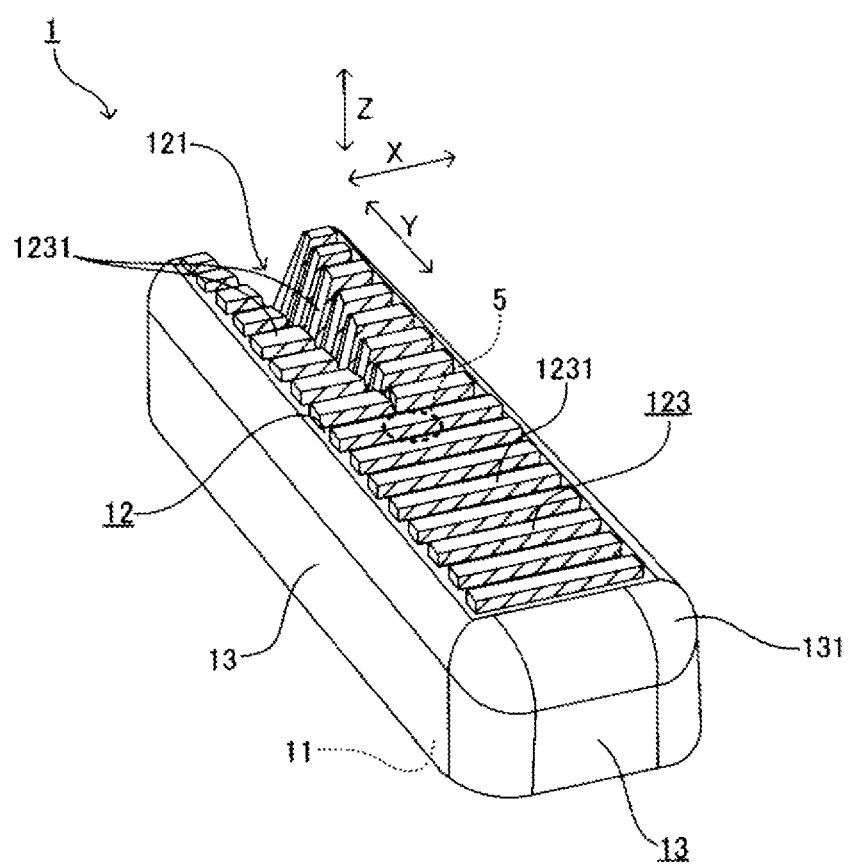
FIG. 1 is a schematic perspective bird's eye view illustrating a drip irrigation dripper according to Embodiment 1 of the present invention.

FIG. 1 is a schematic perspective bird's eye view of drip irrigation dripper 1 according to Embodiment 1 of the present invention. FIG. 2 is a plan view of drip irrigation dripper 1 illustrated in FIG. 1. FIG. 3 is a schematic sectional view illustrating drip watering tube 2 as a drip irrigation device according to Embodiment 1.

Figure 3:
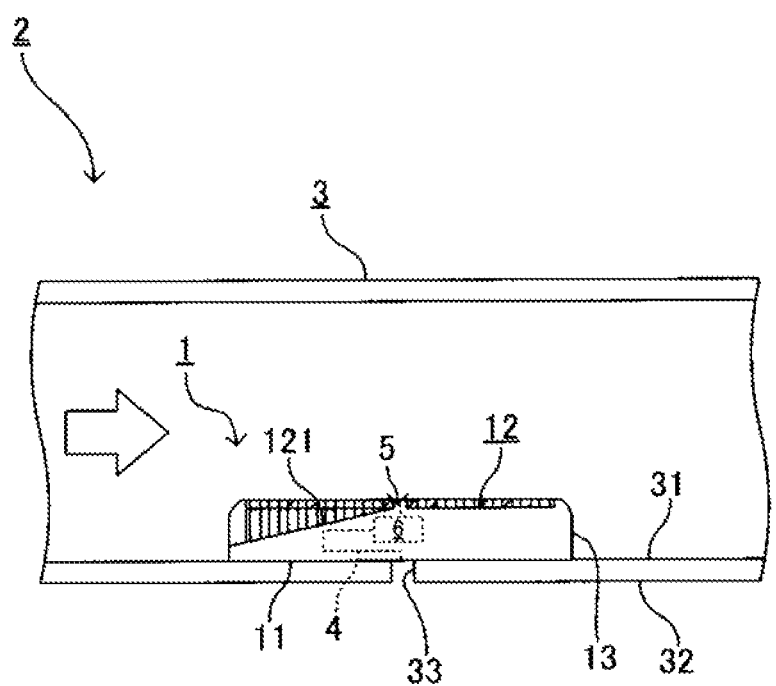
FIG. 3 is a schematic sectional view illustrating a drip watering tube as a drip irrigation device according to Embodiment 1.

As illustrated in FIG. 3, drip watering tube 2 in Embodiment 1 includes substantially cylindrical elongated tube main body 3 as a flow pipe for flowing the irrigation liquid, and drip irrigation dripper 1 disposed inside tube main body 3.

In addition, as illustrated in FIG. 3, drip irrigation dripper 1 is disposed on inner peripheral surface 31 of tube main body 3 at a position corresponding to ejection port 33 for irrigation liquid which extends through inner peripheral surface 31 and outer peripheral surface 32 of tube main body 3 in such a manner as to cover ejection port 33. Drip irrigation dripper 1 controls the ejection amount of the irrigation liquid from corresponding ejection port 33 per unit time.

It is noted that while FIG. 3 illustrates one drip irrigation dripper 1 and one ejection port 33 for convenience's sake, a plurality of drip irrigation drippers 1 and ejection ports 33 are disposed at predetermined intervals along the length of tube main body 3 in practical use.

In addition, in FIG. 3, the left and right sides of the channel inside tube main body 3 correspond to the upstream (water source) side and the downstream side, respectively.

Figure 2:
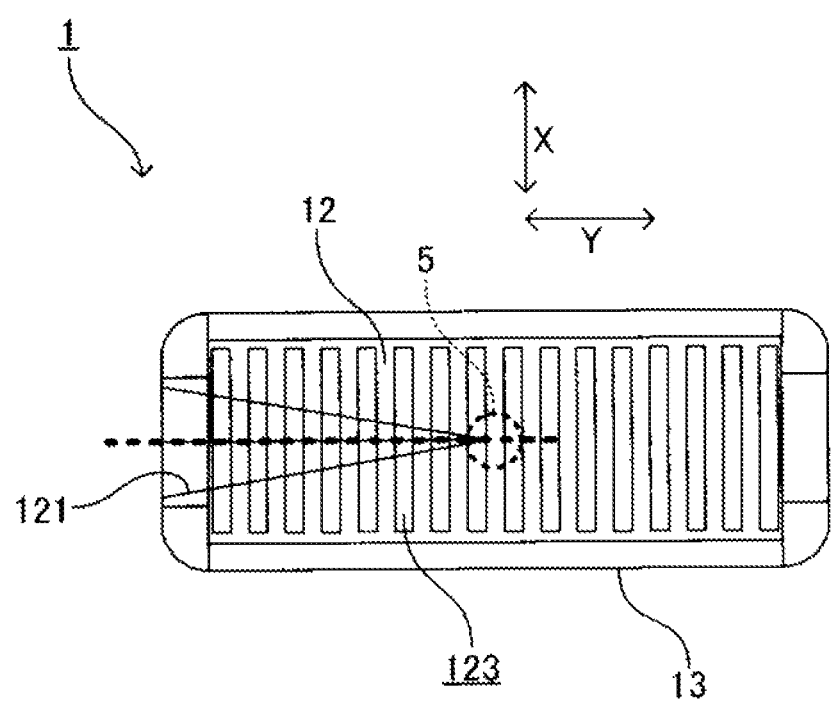
FIG. 2 is a plan view of the drip irrigation dripper illustrated in FIG. 1.

Further, as illustrated in FIGS. 1 to 3, drip irrigation dripper (drip irrigation dripper main body) 1 is formed into a shape of substantially cuboid plate in appearance elongated in the longitudinal direction of tube main body 3.

That is, as illustrated in FIGS. 1 to 3, the approximate contour of drip irrigation dripper 1 is composed of bottom surface 11, top surface 12 opposite to bottom surface 11, and side surface 13 connecting bottom surface 11 to top surface 12. The materials for drip irrigation dripper 1 and tube main body 3 are not particularly limited. For example, the material for drip irrigation dripper 1 is a resin such as polypropylene, and the material for tube main body 3 is a resin such as polyethylene having a melting point lower than that of drip irrigation dripper 1. In addition, the method of manufacturing tube main body 3 is not particularly limited, either. For example, tube main body 3 may be formed by extrusion molding.

Drip irrigation dripper 1 is joined to inner peripheral surface 31 of tube main body 3 at bottom surface 11. For example, joining of drip irrigation dripper 1 formed by extrusion molding to inner peripheral surface 31 of tube main body 3 may be designed to be completed concurrently with the curing of tube main body 3 after disposing drip irrigation dripper 1 on inner peripheral surface 31 of uncured tube main body 3.

<Channel, Inflow Part and Ejection Amount Control Part>

As illustrated in FIGS. 1 to 3, inflow part 5 that allows the irrigation liquid in tube main body 3 to flow into channel 4 inside drip irrigation dripper 1 is disposed on top surface 12 of drip irrigation dripper 1. Further, as illustrated in FIG. 3, ejection amount control part 6 that controls the ejection amount of the irrigation liquid to be ejected from ejection port 33 through channel 4 is disposed at a position on the downstream side of inflow part 5 in channel 4.

It is noted that channel 4 either may be formed only by drip irrigation dripper 1, or may be formed by drip irrigation dripper 1 and inner peripheral surface 31 of tube main body 3.

In addition, inflow part 5 may be provided with a single or a plurality of inflow ports bored on top surface 12 to allow communication between the outside of drip irrigation dripper 1 (channel inside tube main body 3) and channel 4.

Further, ejection amount control part 6 may have a pressure reduction channel part for forming a pressure reduction channel (a part of channel 4) that allows the irrigation liquid having flowed from inflow part 5 to flow toward ejection port 33 while reducing the pressure of the irrigation liquid. Furthermore, ejection amount control part 6 may have a diaphragm part that is disposed to be exposed to the liquid pressure of the irrigation liquid and is formed to be deformed toward ejection port 33 larger as the liquid pressure becomes larger so as to increase the shielding amount of ejection port 33 or channel 4 immediately before ejection port 33.

PTL 1 discloses a configuration to allow irrigation water to flow from a housing inlet (inflow part) into a restriction channel (pressure reduction channel) for pressure reduction and allow the irrigation water of which pressure was reduced to flow out of a housing outlet toward an ejection port, and to control the inflow and the outflow with a film (diaphragm part). In addition, Japanese Patent Application No. 2012-118551 filed prior to the present application discloses a drip irrigation dripper that includes an inflow part, a pressure reduction channel part and a diaphragm part, and that is formed integrally of a resin material. Further, Japanese Patent Application No. 2012-216575 discloses a drip irrigation dripper that has an inflow control part (inflow part), a pressure reduction channel part and a flow rate control part, and that is formed integrally of a resin material. These disclosed techniques may be employed as means for embodying channel 4, inflow part 5, and ejection amount control part 6 of drip irrigation dripper 1 of the present embodiment.

<First Groove Part>

As illustrated in FIGS. 1 to 3, first groove part 121 is formed in top surface 12 to extend from a first end (left end in FIG. 2) toward a second end (right end in FIG. 2) in the longitudinal direction (Y direction) of top surface 12. It is noted that, as illustrated in FIG. 3, the first end in the longitudinal direction of top surface 12 is an end portion on the upstream side in the flow direction of the irrigation liquid in tube main body 3. In addition, the end portion on the second end side in the longitudinal direction of first groove part 121 is positioned closer to the first end side than the center portion to the first end side in the longitudinal direction of top surface 12.

To elaborate more specifically, as illustrated in FIGS. 1 to 3, first groove part 121 is formed into such a wedge shape (in other words, triangle pyramid shape) that the groove width (dimension in X direction) and the groove depth (dimension in Z direction) are gradually decreased toward the second end in the longitudinal direction of top surface 12.

In addition, first groove part 121 is formed such that the groove depth is gradually increased toward the center portion in the groove width direction.

The center line (see broken straight line in FIG. 2) in the groove width direction of first groove part 121 is parallel to the longitudinal direction of top surface 12. First groove part 121 has a shape of isosceles triangle in a plan view (FIG. 2).

<Filter Structure>

As illustrated in FIGS. 1 to 3, filter structure 123 for inhibiting foreign matters from entering channel 4 is formed on top surface 12 including first groove part 121.

The filter structure 123 has a plurality of convex parts 1231. The plurality of convex parts 1231 are elongated in the width direction (X direction) of top surface 12, and has a predetermined height (dimension in Z direction). The convex parts 1231 are disposed at predetermined intervals in the longitudinal direction of top surface 12.

(Operation and Effect)

With drip irrigation dripper 1 of Embodiment 1, a part of the irrigation liquid flowing in tube main body 3 flows into channel 4 of drip irrigation dripper 1 from inflow part 5, and the ejection amount thereof is controlled by ejection amount control part 6, so that the irrigation liquid is ejected from ejection port 33 toward the outside of drip watering tube 2.

On the other hand, the irrigation liquid not flowing into drip irrigation dripper 1 passes over top surface 12 of drip irrigation dripper 1 to flow toward the downstream in tube main body 3. At that time, the resistance by drip irrigation dripper 1 to the irrigation liquid passing over first groove part 121 is effectively reduced by first groove part 121. In addition, the flow is gathered toward the center portion in the width direction of first groove part 121 to allow the flow to be straightened along the central portion, and thus high rectilinearity toward the downstream in tube main body 3 can be performed. In other words, pressure drop of the irrigation liquid caused by drip irrigation dripper 1 is effectively reduced by first groove part 121.

Thus, the irrigation liquid can be allowed to flow toward the downstream in tube main body 3 while maintaining the liquid pressure, thereby securing the opportunity for drip irrigation dripper 1 on the downstream side to eject the irrigation liquid. In this manner, the irrigation liquid in tube main body 3 can be allowed to flow efficiently up to the downstream side by alleviating the pressure drop caused by drip irrigation dripper 1. Therefore, disposing a plurality of drip irrigation drippers 1 according to the present invention along tube main body 3 makes it possible to properly perform long-distance watering.

Since the irrigation liquid can pass over first groove part 121 at high speed, the irrigation liquid can flush filter structure 123 on first groove part 121. Therefore, it is possible to reduce a deterioration in the performance of drip irrigation dripper 1.

As illustrated in FIG. 1, a portion in side surface 13 in a predetermined range closer to top surface 12 may be formed into curved surface 131, to thereby further reduce pressure drop.

Embodiment 2

Next, drip irrigation dripper 1 according to Embodiment 2 of the present invention will be described with reference to FIGS. 4 to 7.

(Configuration)

Figure 4:
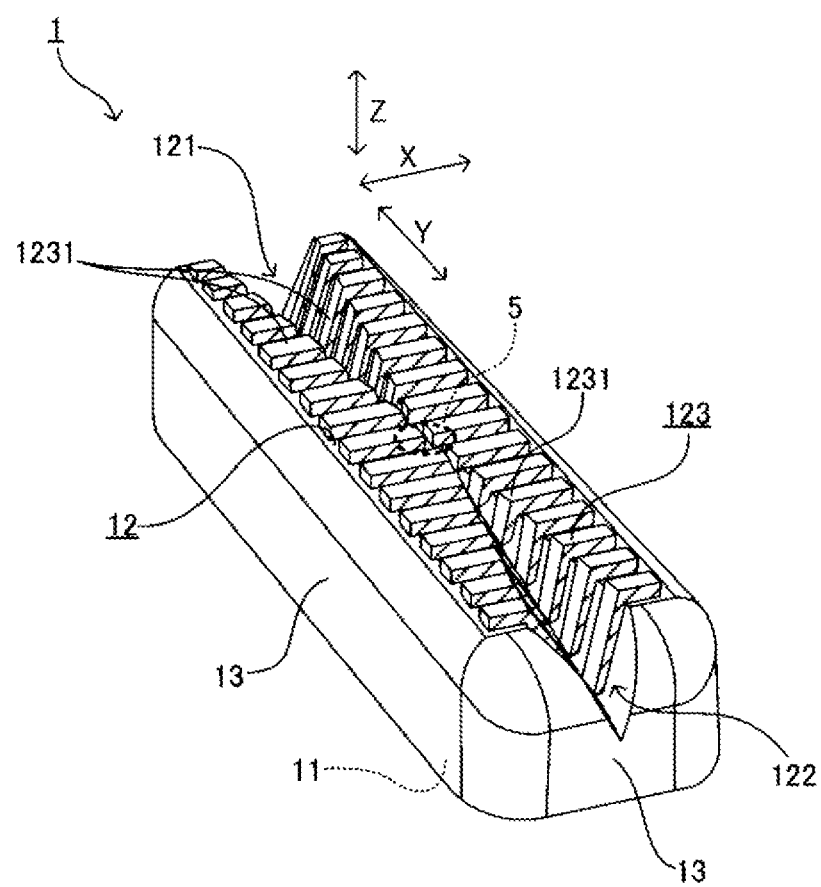
FIG. 4 is a schematic perspective bird's eye view illustrating a drip irrigation dripper according to Embodiment 2 of the present invention.
Figure 5:
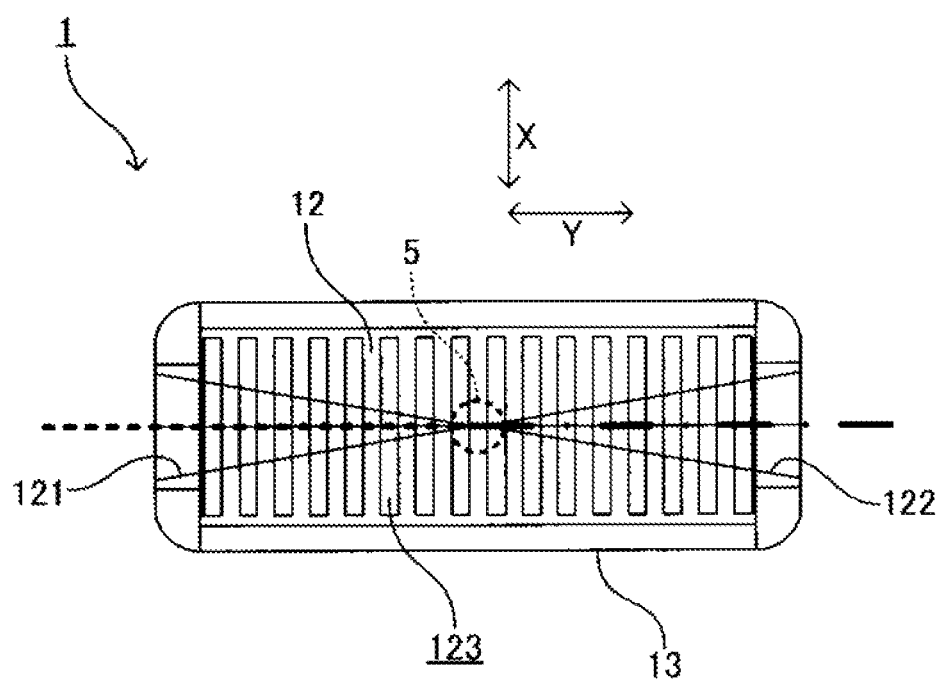
FIG. 5 is a plan view of the drip irrigation dripper illustrated in FIG. 4.
Figure 6:
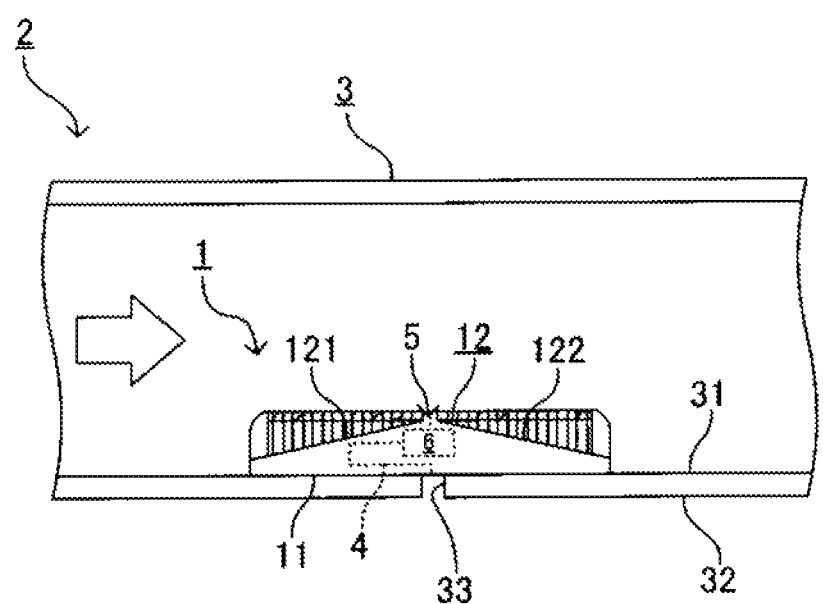
FIG. 6 is a schematic sectional view of a drip watering tube for the drip irrigation dripper according to Embodiment 2 of the present invention.

FIG. 4 is a schematic perspective bird's eye view illustrating a drip irrigation dripper according to Embodiment 2 of the present invention. FIG. 5 is a plan view of the drip irrigation dripper illustrated in FIG. 4. FIG. 6 is a schematic sectional view of a drip watering tube for the drip irrigation dripper according to Embodiment 2 of the present invention.

<Second Groove Part>

As illustrated in FIGS. 4 to 6, drip irrigation dripper 1 of Embodiment 2 includes second groove part 122 formed in top surface 12, in addition to the configuration of drip irrigation dripper 1 of Embodiment 1.

Specifically, as illustrated in FIGS. 4 to 6, second groove part 122 extends from a second end (right end in FIG. 5) toward a first end (left end in FIG. 5) in the longitudinal direction (Y direction) of top surface 12. In addition, the end portion on the first end side in the longitudinal direction of second groove part 122 is positioned closer to the second end side in the longitudinal direction than the center portion in the longitudinal direction of top surface 12 to the second end side. It is noted that the present embodiment is similar to Embodiment 1 in that first groove part 121 is formed from the first end toward the second end in the longitudinal direction of top surface 12.

To elaborate more specifically, as illustrated in FIGS. 4 to 6, second groove part 122 is formed into such a wedge shape (in other words, triangle pyramid shape) that the groove width (dimension in X direction) and the groove depth (dimension in Z direction) are gradually decreased toward the first end in the longitudinal direction of top surface 12.

In addition, second groove part 122 is formed such that the groove depth is gradually increased toward the center portion in the groove width direction.

Further, the center line (see dashed line in FIG. 5) in the groove width direction of second groove part 122 is parallel to the longitudinal direction of top surface 12. Second groove part 122 has a shape of isosceles triangle in a plan view (FIG. 5). It is noted that the shape of second groove part 122 may be congruent with the shape of first groove part 121. In addition, as illustrated in FIG. 5, the center line of second groove part 122 may be disposed collinearly with the center line (broken straight line) of first groove part 121.

(Operation and Effect)

Figure 7:
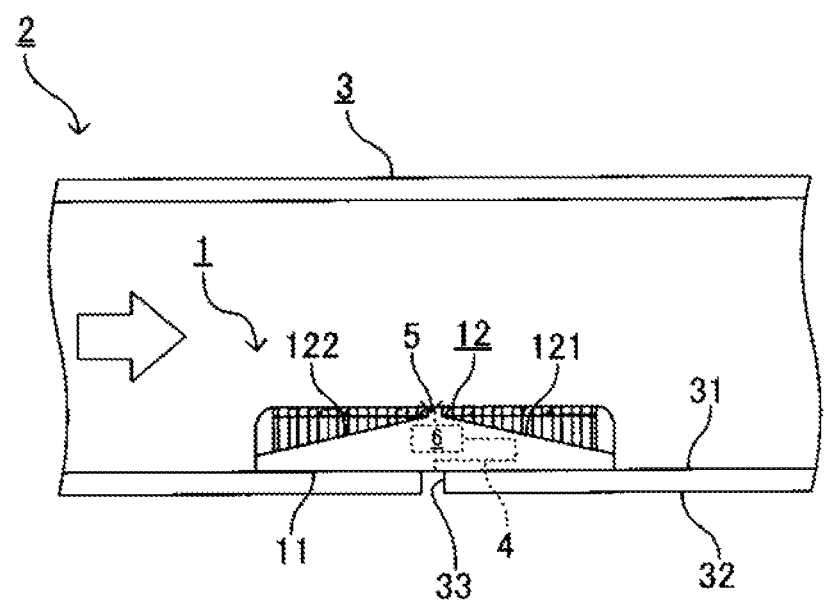
FIG. 7 is an explanatory drawing of the operation and effect in Embodiment 2.

With drip irrigation dripper 1 of Embodiment 2, even if drip irrigation dripper 1 is incorporated into tube main body 3 reversely (wrongly assembled) in the longitudinal direction unlike the configuration illustrated in FIG. 6, as illustrated in FIG. 7, second groove part 122, instead of first groove part 121, can perform the function of enhancing the rectilinearity of the irrigation liquid.

In addition, since drip irrigation dripper 1 of Embodiment 2 has the configuration capable of absorbing the manufacturing error, the manufacturing easiness and the yield rate can be enhanced.

Embodiment 3

Next, drip irrigation dripper 1 according to Embodiment 3 of the present invention will be described with reference to FIGS. 8 to 10.

(Configuration)

Figure 8:
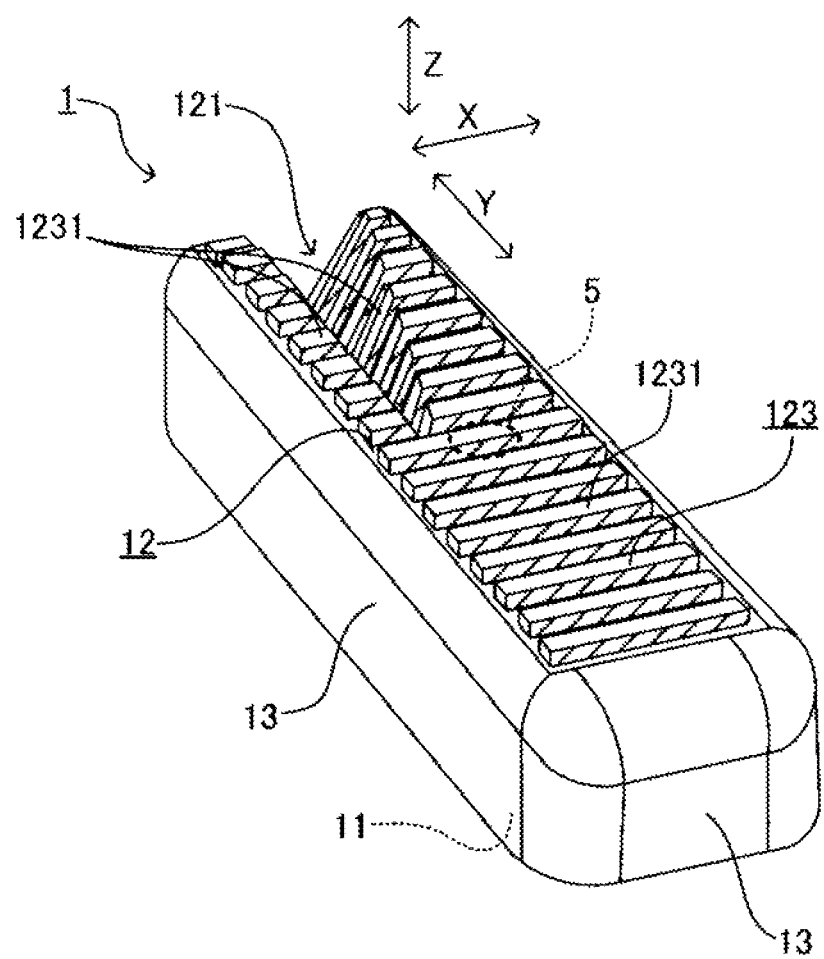
FIG. 8 is a schematic perspective bird's eye view illustrating a drip irrigation dripper according to Embodiment 3 of the present invention.

FIG. 8 is a schematic perspective bird's eye view illustrating a drip irrigation dripper according to Embodiment 3 of the present invention. FIG. 9 is a plan view of the drip irrigation dripper illustrated in FIG. 8. FIG. 10 is an explanatory drawing of the operation and effect of the drip irrigation dripper according to Embodiment 3.

Figure 9:
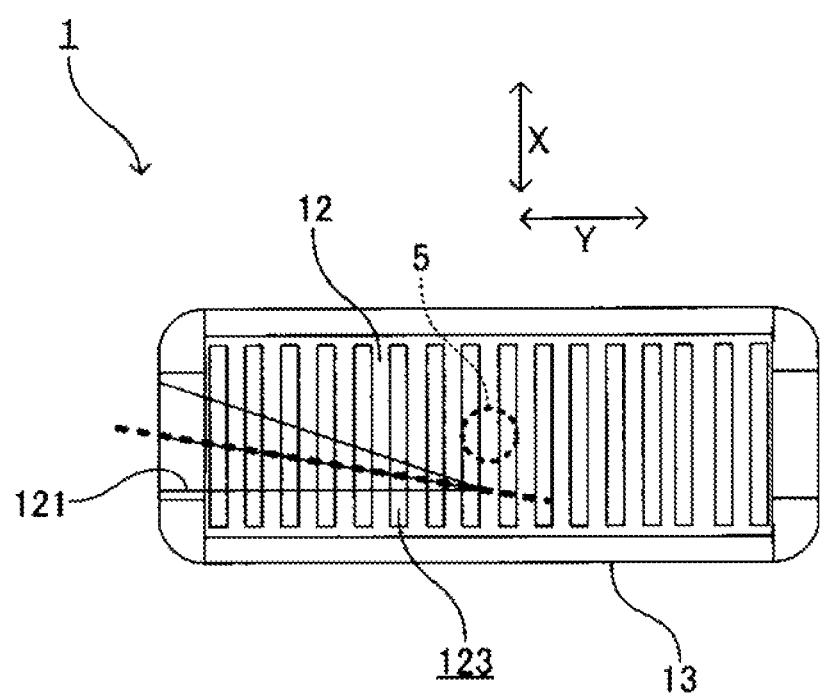
FIG. 9 is a plan view of the drip irrigation dripper illustrated in FIG. 8.

As illustrated in FIGS. 8 and 9, drip irrigation dripper 1 according to Embodiment 3 and drip irrigation dripper 1 according to Embodiment 1 differ in that the center line (see broken straight line in FIG. 9) of first groove part 121 is inclined relative to the longitudinal direction (Y direction) of top surface 12.

(Operation and Effect)

Figure 10:
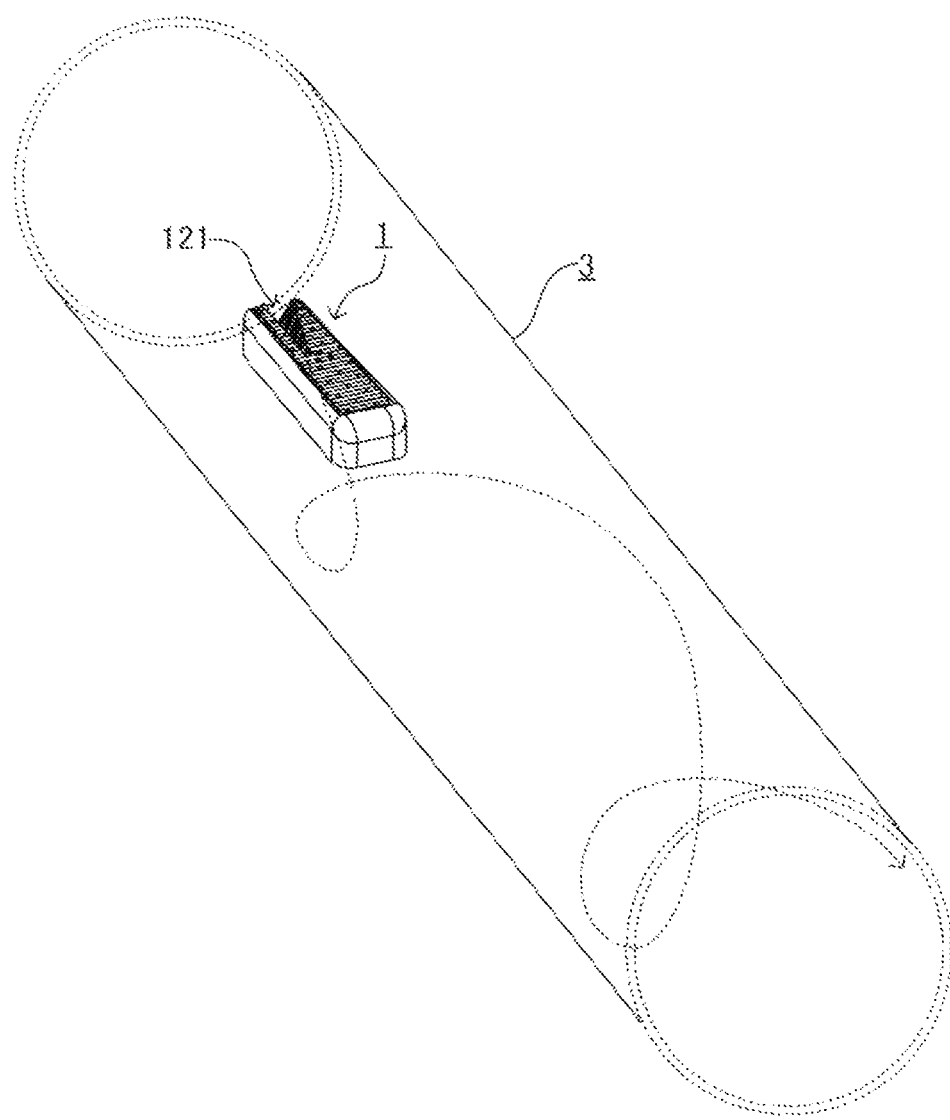
FIG. 10 is an explanatory drawing of the operation and effect of the drip irrigation dripper according to Embodiment 3.

According to the present embodiment, as illustrated in FIG. 10, first groove part 121 generates a flow of the irrigation liquid that is inclined relative to the longitudinal direction of tube main body 3, thereby allowing the flow to be a spiral vortex flow to move toward the downstream in tube main body 3. Such a spiral vertex flow is not easily resisted by drip irrigation dripper 1 compared with a linear flow, and thus pressure drop can be reduced further effectively.

In addition, when every drip irrigation drippers 1 inside tube main body 3 has similar inclined first groove part 121, the spiral vortex flow can be sustained, and thus pressure drop can be reduced more effectively.

(Modification)

Figure 11:
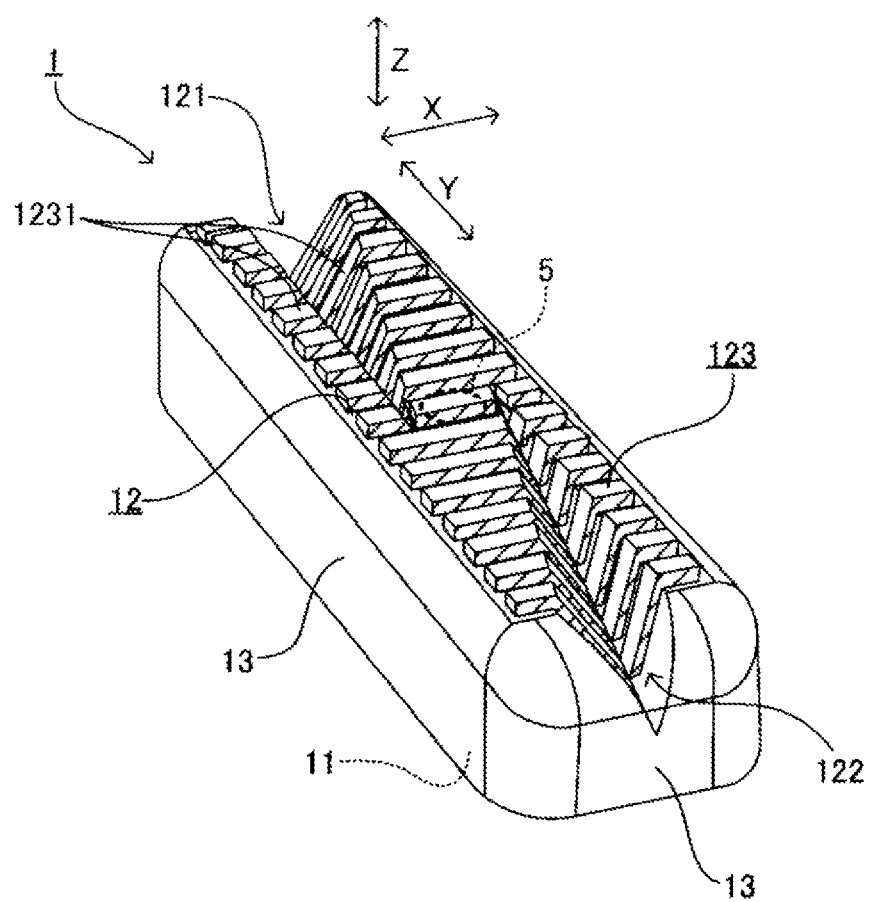
FIG. 11 is a schematic perspective bird's eye view illustrating a drip irrigation dripper according to a modification of Embodiment 3.
Figure 12:
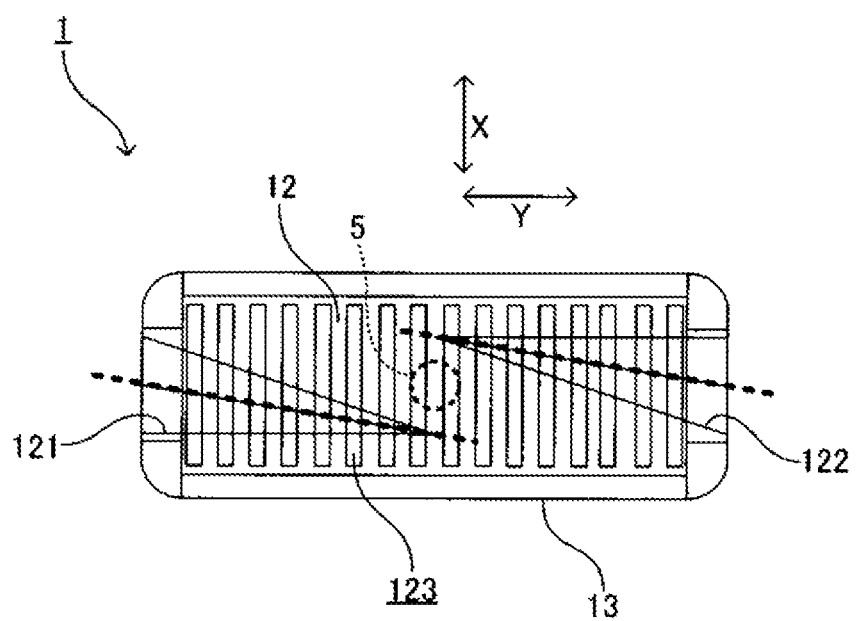
FIG. 12 is a plan view of the drip irrigation dripper illustrated in FIG. 11.

FIG. 11 is a schematic perspective bird's eye view illustrating a drip irrigation dripper according to a modification of Embodiment 3. FIG. 12 is a plan view of the drip irrigation dripper illustrated in FIG. 11.

It is noted that, as illustrated in FIGS. 11 and 12, the configuration of Embodiment 2 can also be applied to drip irrigation dripper 1 according to Embodiment 3. In this case, as illustrated in FIG. 12, first groove part 121 and second groove part 122 may be formed such that the center lines thereof are parallel to each other.

According to the present modification, the cooperative operation of first groove parts 121 and second groove parts 122 of a plurality of drip irrigation drippers inside tube main body 3 can sustain the spiral vortex flow over a longer distance, and thus the pressure drop can be reduced further effectively.

It is noted that the present invention shall not be limited to the above-described embodiments, and may be modified in various manners as long as the feature of the present invention is attained.

For example, inflow part 5 may be formed on first groove part 121 or second groove part 122.

Filter structure 123 on first groove part 121 and second groove part 122 may be provided as necessary.

Figure 13:
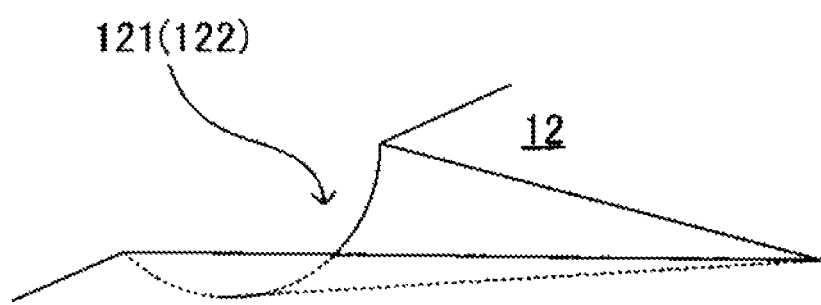
FIG. 13 is a perspective view illustrating the main portion of another embodiment of the present invention.

FIG. 13 is a perspective view illustrating the main portion of another embodiment of the present invention. As illustrated in FIG. 13, first groove part 121 and second groove part 122 may be formed into a substantially semi-conical shape.

This application is entitled to and claims the benefit of Japanese Patent Application No. 2012-278353 filed on Dec. 20, 2012, the disclosure of which including the specification, drawings and abstract is incorporated herein by reference in its entirety.

INDUSTRIAL APPLICABILITY

According to the present invention, it is possible to easily provide a dripper in which dropping of liquid is performed at a suitable rate using the pressure of the liquid to be dropped. Therefore, it is expected that the dripper is broadly applied in the technical fields of drip irrigation, an endurance test and the like where dropping for a long period of time is desired, and that the further development in the technical fields is achieved.

REFERENCE SIGNS LIST

1 Drip irrigation dripper
3 Tube main body
4 Channel
5 Inflow part
6 Ejection amount control part
11 Bottom surface
12 Top surface
31 Inner peripheral surface
33 Ejection port
121 First groove part
122 Second groove part

The invention claimed is:

1. A drip irrigation dripper to be disposed on an inner peripheral surface of an elongated flow pipe configured to allow an irrigation liquid to flow therethrough at a position corresponding to an ejection port for the irrigation liquid, the ejection port extending through the inner peripheral surface and an outer peripheral surface of the elongated flow pipe, the drip irrigation dripper comprising:

a drip irrigation dripper main body having a shape of a plate elongated in a longitudinal direction and having a bottom surface to be joined to the inner peripheral surface of the flow pipe and a top surface opposite to the bottom surface;

an inflow part disposed in the top surface to allow the irrigation liquid in the flow pipe to flow into a channel of the drip irrigation dripper main body;

an ejection amount control part disposed at a first position on a downstream side of the inflow part in the channel of the drip irrigation dripper main body to control an amount of the irrigation liquid flowing into a second position corresponding to the ejection port through the channel; and a first groove part formed in the top surface that is a part of an exterior surface of the drip irrigation dripper, the first groove part extending from a first end toward a second end of the top surface in the longitudinal direction, wherein the first groove part is adjacent to an outside of the drip irrigation dripper and has a wedge shape, wherein a groove width and a groove depth of the first groove part are gradually decreased toward the second end, and wherein the groove depth of the first groove part is gradually increased toward a center portion of the first groove part in a groove width direction.

2. The drip irrigation dripper according to claim 1, wherein a center line of the first groove part in the groove width direction is inclined relative to the longitudinal direction.

3. The drip irrigation dripper according to claim 1, wherein a filter structure for inhibiting foreign matter from entering the channel is formed in the first groove part.

4. The drip irrigation dripper according to claim 1, further comprising a second groove part formed in the top surface, the second groove part extending from the second end toward the first end of the top surface in the longitudinal direction, wherein the second groove part is adjacent to the outside of the drip irrigation dripper, and wherein a groove width and a groove depth of the second groove part are gradually decreased toward the first end.

5. The drip irrigation dripper according to claim 4, wherein the second groove part is formed into a wedge shape.

6. The drip irrigation dripper according to claim 5, wherein the groove depth of the second groove part is gradually increased toward a center portion of the second groove part in a groove width direction.

7. The drip irrigation dripper according to claim 6, wherein a center line of the second groove part in the groove width direction is inclined relative to the longitudinal direction.

8. The drip irrigation dripper according to claim 2, further comprising a second groove part formed in the top surface, the second groove part extending from the second end toward the first end of the top surface in the longitudinal direction, wherein the second groove part is adjacent to the outside of the drip irrigation dripper, and wherein a groove width and a groove depth of the second groove part are gradually decreased toward the first end, and a center line of the second groove part in the groove width direction is parallel to the center line of the first groove part.

9. The drip irrigation dripper according to claim 4, wherein a filter structure for inhibiting foreign matter from entering the channel is formed in the second groove part.

10. A drip irrigation device comprising:

an elongated flow pipe configured to allow an irrigation liquid to flow therethrough; and a drip irrigation dripper disposed on an inner peripheral surface of the elongated flow pipe at a first position corresponding to an ejection port for the irrigation liquid, the ejection port extending through the inner peripheral surface and an outer peripheral surface of the flow pipe, wherein the drip irrigation dripper comprises:

a drip irrigation dripper main body having a shape of a plate elongated in a longitudinal direction of the flow pipe and having a bottom surface to be joined to the inner peripheral surface of the flow pipe and a top surface opposite to the bottom surface;

an inflow part disposed in the top surface to allow the irrigation liquid in the flow pipe to flow into a channel of the drip irrigation dripper main body;

an ejection amount control part disposed at a second position on a downstream side of the inflow part in the channel of the drip irrigation dripper main body to control an amount of the irrigation liquid flowing into the first position corresponding to the ejection port through the channel; and a first groove part formed in the top surface that is a part of an exterior surface of the drip irrigation dripper, the first groove part extending from a first end toward a second end of the top surface in the longitudinal direction of the flow pipe, wherein the first groove of the drip irrigation dripper is adjacent to a channel inside the elongated flow pipe and has a wedge shape, wherein a groove width and a groove depth of the first groove part are gradually decreased toward the second end, and where the groove depth of the first groove part is gradually increased toward a center portion of the first groove part in a groove width direction.

11. The drip irrigation device according to claim 10, wherein the first groove part is disposed in the top surface on an upstream end side in a flow direction of the irrigation liquid in the flow pipe.

\* \* \* \* \*